(12) United States Patent
Vasudevan et al.

(10) Patent No.: US 11,394,580 B2
(45) Date of Patent: Jul. 19, 2022

(54) DATA TRANSMISSION

(71) Applicant: Alcatel Lucent, Nozay (FR)

(72) Inventors: Subramanian Vasudevan, Murray Hill, NJ (US); Satish Kanugovi, Bangalore (IN)

(73) Assignee: Alcatel Lucent, Nozay (FR)

( * ) Notice: Subject to any disclaimer, the term of this patent is extended or adjusted under 35 U.S.C. 154(b) by 117 days.

(21) Appl. No.: 16/077,205

(22) PCT Filed: Feb. 15, 2017

(86) PCT No.: PCT/EP2017/053393
§ 371 (c)(1),
(2) Date: Aug. 10, 2018

(87) PCT Pub. No.: WO2017/140722
PCT Pub. Date: Aug. 24, 2017

(65) Prior Publication Data
US 2019/0036735 A1    Jan. 31, 2019

(30) Foreign Application Priority Data

Feb. 18, 2016   (IN) .............................. 201641005744

(51) Int. Cl.
*H04L 12/46*   (2006.01)
*H04L 12/28*   (2006.01)
(Continued)

(52) U.S. Cl.
CPC ...... *H04L 12/4633* (2013.01); *H04L 12/2856* (2013.01); *H04L 45/306* (2013.01);
(Continued)

(58) Field of Classification Search
CPC ............ H04L 12/2856; H04L 12/4633; H04L 2212/00; H04L 69/08; H04L 45/306; H04L 45/52
See application file for complete search history.

(56) References Cited

U.S. PATENT DOCUMENTS 7,136,377 B1 * 11/2006 Tweedly ............. H04L 12/4633
                                                        370/356
7,545,780 B2 *  6/2009 Chitrapu ................. H04L 45/04
                                                        370/338
(Continued)

OTHER PUBLICATIONS

PCT Patent Application No. PCT/EP2017/053393, Written Opinion of the International Searching Authority, dated Apr. 25, 2017, 7 pages.

(Continued)

*Primary Examiner* — Steven H Nguyen
(74) *Attorney, Agent, or Firm* — Fay Sharpe LLP (57) ABSTRACT

Aspects relating to data transmission are described herein. In an implementation, in a method for data transmission, a tunneling protocol header is appended to a payload to obtain an encapsulated data packet, and at least one field is modified in the tunneling protocol header to indicate at least one of an access network (108) and a core network (108) for transmitting the encapsulated data packet, and the access network (108) and the core network (110) belong to different communication networks (104). Further, based on the tunneling protocol header, the encapsulated data packet is delivered to a routing unit for transmission.

13 Claims, 5 Drawing Sheets

(51) Int. Cl.
*H04L 45/302* (2022.01)
*H04L 45/52* (2022.01)
*H04L 69/08* (2022.01)
*H04L 45/00* (2022.01)
*H04L 47/34* (2022.01)
*H04W 40/02* (2009.01)

(52) U.S. Cl.
CPC .............. *H04L 45/52* (2013.01); *H04L 69/08* (2013.01); *H04L 45/34* (2013.01); *H04L 47/34* (2013.01); *H04L 2212/00* (2013.01); *H04W 40/02* (2013.01)

(56) References Cited

U.S. PATENT DOCUMENTS

| | | | |
|---|---|---|---|
| 7,706,367 B2 | 4/2010 | Das et al. | |
| 2002/0161905 A1* | 10/2002 | Haverinen | H04L 29/06 709/229 |
| 2005/0025163 A1* | 2/2005 | Christie | H04L 65/1069 370/401 |
| 2005/0058100 A1* | 3/2005 | Lee | H04W 40/24 370/331 |
| 2006/0268820 A1* | 11/2006 | Mahkonen | H04W 28/06 370/349 |
| 2007/0004405 A1* | 1/2007 | Buckley | H04W 48/16 455/434 |
| 2007/0087748 A1* | 4/2007 | Du | H04W 36/0011 455/436 |
| 2008/0107123 A1* | 5/2008 | Rune | H04L 45/00 370/401 |
| 2008/0186897 A1* | 8/2008 | Rune | H04L 45/00 370/315 |
| 2008/0214175 A1* | 9/2008 | Papadoglou | H04W 88/16 455/422.1 |
| 2009/0268664 A1* | 10/2009 | Hirano | H04W 8/082 370/328 |
| 2009/0316623 A1* | 12/2009 | Pettersson | H04L 45/02 370/328 |
| 2010/0046474 A1* | 2/2010 | Kozakai | H04W 4/20 370/331 |
| 2010/0046512 A1* | 2/2010 | Xia | H04L 12/4633 370/389 |
| 2010/0142477 A1* | 6/2010 | Yokota | H04W 36/0072 370/331 |
| 2010/0226310 A1* | 9/2010 | Kuparinen | H04L 45/00 370/328 |
| 2012/0044920 A1* | 2/2012 | Wang | H04L 69/16 370/338 |
| 2012/0303747 A1* | 11/2012 | Emberger | H04B 7/18506 709/217 |
| 2013/0121241 A1* | 5/2013 | Sebire | H04W 48/18 370/328 |
| 2014/0092810 A1* | 4/2014 | Lee | H04W 48/18 370/328 |
| 2014/0105129 A1* | 4/2014 | Chen | H04W 72/0406 370/329 |
| 2015/0098472 A1 | 4/2015 | Choi et al. | |
| 2015/0181459 A1* | 6/2015 | Zhu | H04L 65/80 370/236 |
| 2016/0134531 A1* | 5/2016 | Assarpour | H04L 49/309 370/392 |
| 2016/0135074 A1* | 5/2016 | Welin | H04L 12/4633 370/235 |
| 2016/0139939 A1* | 5/2016 | Bosch | G06F 9/45558 718/1 |
| 2018/0227221 A1* | 8/2018 | Starsinic | H04W 88/16 |

OTHER PUBLICATIONS

RFC 1702, Hanks et al., Generic Routing Encapsulation over IPv4 networks, Oct. 1994, 4 pages.

* cited by examiner

DATA TRANSMISSION

FIELD OF INVENTION

The present subject matter relates to communication networks and, particularly but not exclusively to data transmission in communication networks.

BACKGROUND

A communication network typically provides communication services, such as by transmission of data packets, to network terminals or user equipment (UE) in the communication network. In order to provide such services, the communication network may include an access network and an associated core network. Generally, a communication network environment may include a plurality of communication networks, i.e., a plurality of access networks and a core network associated with each of the access networks, and at any instant in time, the network terminal may communicate with one access network and the associated core network. In other words, at an instant of time, the network terminal may be anchored to one core network and may exchange the data with one core network via the associated access network. Accordingly, in operation, the core network may receive data, such as a request, from the network terminal and transmit the data to a target terminal, for example, an application server, through the core network. Further, the core network may receive the data, in response, from the target terminal and provide the data to the network terminal over the access network.

SUMMARY

This summary is provided to introduce concepts related to data transmission in a communication network. This summary is not intended to identify essential features of the claimed subject matter nor is it intended for use in determining or limiting the scope of the claimed subject matter.

In one implementation, a method for data transmission is described. In said implementation, a tunneling protocol header is appended to a payload to obtain an encapsulated data packet, and at least one field is modified in the tunneling protocol header to indicate at least one of an access network and a core network for transmitting the encapsulated data packet, where the access network and the core network belong to different communication networks. Further, based on the tunneling protocol header, the encapsulated data packet is delivered to a routing unit for transmission.

In another implementation, a method of routing data is described. In said implementation, an encapsulated data packet is intercepted. The encapsulated data packet can include a tunneling protocol header appended to a payload, the tunneling protocol header indicative of at least one of an access network and a core network for transmitting the encapsulated data packet, and the access network and the core network belong to different communication networks. The tunneling protocol header can be used to determine a routing unit. Further, using the determined routing unit, the encapsulated data packet is transmitted to a target terminal, based on the tunneling protocol header.

In yet another implementation, a network terminal is described. The network terminal includes a processor, and a modification module and a delivery module, both coupled to the processor. The modification module can append a tunneling protocol header to a payload to obtain an encapsulated data packet and modify at least one field in the tunneling protocol header to indicate at least one of an access network and a core network to transmit the encapsulated data packet. The access network and the core network can belong to different communication networks. Further, the delivery module can deliver the encapsulated data packet to a routing unit for transmission based on the tunneling protocol header.

In further another implementation, a routing unit is described. The routing unit includes a processor, and an interception module and a transmission module, both coupled to the processor. The interception module can intercept an encapsulated data packet, the encapsulated data packet including a tunneling protocol header appended to a payload. The tunneling protocol header can indicate of at least one of an access network and a core network for transmitting the encapsulated data packet, the access network and the core network belonging to different communication networks. Further, the transmission module can transmit the encapsulated data packet to a target terminal, based on the tunneling protocol header.

In one other implementation, a non-transitory computer-readable medium is described. The non-transitory computer-readable medium includes instructions executable by a processing resource to append a tunneling protocol header to a payload to obtain an encapsulated data packet. As part of appending, at least one field in the tunneling protocol header is modified to indicate at least one of an access network and a core network for transmitting the encapsulated data packet, where the access network and the core network belong to different communication networks. Further, the non-transitory computer-readable medium is to deliver the encapsulated data packet to a routing unit for transmission based on the tunneling protocol header.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

DESCRIPTION OF EMBODIMENTS

Generally, an application running on a network terminal, such as a user equipment, may attempt to establish communication with a target terminal, such as an application server, by transmitting data packets in an uplink route through an access network and a core network associated with the access network. The network terminal may include a unique identification address (UIA) of the target terminal in the data packets sent in an uplink route, based on which, the communication network may communicate the data packets to the target terminal. In a downlink route, the core network may allocate a UIA to the network terminal and can, accordingly, transmit data packets received from the target terminal to the network terminal over the access network.

Conventionally, the network terminal, at one instant, may be anchored to one communication network, i.e., the network terminal may establish communication services with one core network over the associated access network. For instance, the network terminal may be connected to an enterprise network over an enterprise wireless access network, such as a Wi-Fi access network. In such cases, the network terminal may be connected to a Wi-Fi local area network (WLAN) core, referred to as a WLAN core network, and not to any other core network, such as a cellular service provider's (CSP's) core network.

During operation, the network terminal may have certain access privileges over one communication network and may have certain other access privileges over another communication network. For example, a network terminal running on an enterprise network may provide unrestricted access to an enterprise mail server but may not allow access to social media or media websites. On the other hand, on the cellular network, external to the enterprise network, the network terminal may have unrestricted access to the social media and media websites but may have restricted access to the enterprise mail server. Accordingly, since at a given instant the network terminal may be anchored to one communication network, the application may have selected access privileges available at a given instant and few other access privileges may have to be foregone. As a result, availability and performance of the applications running on the network terminal may be adversely affected.

In addition, with the anchoring of the network terminal in the manner explained above, a suitable routing of the data packets in the communication network may not be achieved. Referring to the above example, certain applications in the enterprise network may be allowed access over the external communication network, such as the cellular network. However, for such applications, the network terminal may have to exchange data packets over the cellular network with the application server local to the enterprise network. In such cases, the data packets may travel from the enterprise network to the cellular network and then to the network terminal over the cellular access network and from the network terminal on a reverse route. Therefore, the data packets may have to traverse the cellular access network and the cellular core network and then come over the enterprise network back to the enterprise application server. Such an operation of the network entities may hinder in effective utilization of resources in the network environment.

In addition, conventional techniques may allow the network terminal to connect over two parallel paths using Transmission Control Protocol (TCP) and is referred to as multipath TCP technique. In such a case, the network terminal may connect to an application server through the broadband network path and through the cellular network path using the TCP. However, such technique may support TCP-based applications and applications based on other protocols may not be able to function using the above mentioned technique. In addition, in the above mentioned technique, both the paths may be used when both the paths have comparable quality and performance. However, such an eventuality may not often occur. Therefore, the multipath TCP technique may allow the usage of one link, i.e., the better performing path out of the multiple paths. Other few conventional techniques may allow the network terminal to connect via a virtual private network (VPN) tunnel and then the application server may connect through the VPN tunnel and an internet protocol (IP) tunnel providing two paths. However, such a technique may be usable with application servers supporting such a technique that may be few in number. In addition, in the above mentioned techniques, link quality may not be assessable and network diagnostics may not be available because the techniques use specific communication protocols which may not allow such network diagnostics at other network layers.

The present subject matter relates to data transmission in a communication network environment having a plurality of communication networks. The present subject matter provides flexibility for selecting the access network and the core network to transmit data packets in the communication network environment having multiple core networks and multiple access networks belonging to various communication networks in the environment. For example, for a set of applications on the network terminal, the network terminal may select a certain combination of an access network and a core network and for another set of applications may select another combination, for transmitting data packets in uplink and downlink routes.

To achieve the above mentioned purpose, the present subject matter provides the network terminal to encapsulate a payload with a tunneling protocol header, such as a generic routing encapsulation (GRE) header. The network terminal may modify one or more fields in the tunneling protocol header and append the tunneling protocol header to the internet protocol (IP) layer payload. Based on the modified field, a routing unit receiving the data packet from the network terminal in the communication network may intercept the data packet and identify at least one of the access network and the core network to be used for data transmission. In one case, the access network and the core network to be used in an uplink route, i.e., from the network terminal to the core network, can be indicated in the tunneling protocol header. In another case, the access network to be used in a downlink route, i.e., from the core network to the network terminal can be indicated in the tunneling protocol header. Further, in an example, the routing unit can be an access node of the access network. For example, in case of a wireless local area network (WLAN), a router can be the routing unit, whereas in case of an Evolved Universal Terrestrial Radio Access Network (EUTRAN), the eNodeB can be the routing unit. Accordingly, the data packet may be routed to another routing unit based on the access network to be used, and then routed to the core network, as per the tunneling protocol header.

The tunneling protocol header may also include a delivery header which may include an intercept unique identification address (UIA). For example, the intercept UIA may be an internet protocol (IP) address associated with the routing unit. In said example, the data packets may be intercepted at an IP layer of the routing unit. The routing unit receiving the data packet from the network terminal, based on the intercept UIA associated with the data packet, may identify that this data packet is not to be routed using the normal route, but is to be routed based on a distinct routing selection of the access network and the core network. Therefore, in other words, the intercept UIA allows the routing unit to identify whether the data packet is to be routed as usual or in accordance with the information in the tunneling protocol header.

Further, in an implementation, in the downlink route, the routing unit may modify the fields in the tunneling protocol header to regulate the routing of the data packets. The data packets received at the routing unit from the associated core network is appended with a tunneling protocol header having the routing information. The tunneling protocol header may indicate whether the packets are to be delivered to the network terminal by the receiving node or forwarded to another routing unit as indicated in the tunneling protocol header. Subsequently, the encapsulated data packet may be routed either by the same routing unit to the network terminal, or in case, another access network is to be used, the encapsulated data packet may be routed via a different routing unit.

In addition, the tunneling protocol header may include information to indicate a sequence in which the data packets are to be routed. In case any data packet is received out of order, the routing unit or the network terminal, may re-order the data packets and thereafter, may route the data packets based on the information in the tunneling protocol header appended to that data packet. Such routing may ensure the delivery to the data packets in the predefined sequence that may be received in out of order by the routing unit. In addition, at the end of the network terminal, the data transmission and routing, in accordance with the present subject matter, can facilitate in the delivery of the data packets in a predefined sequence to other layers, for example, above the IP layer.

In addition to providing the flexibility of choosing various combinations of the access networks and the core networks, the present subject matter provides aggregation of data packets in the uplink route as well as in the downlink route. For example, the network terminal may provide the information in the tunneling protocol header that whether the data packets are received over a EUTRAN access network or a Wi-Fi access network, the data packets are to be routed in the uplink and downlink routes over the EUTRAN access network and a WLAN core network. The data packet received at the Wi-Fi routing unit, may be routed via the EUTRAN routing unit, and then routed to the WLAN core network, based on the tunneling protocol header. The Wi-Fi routing unit may re-order the packets received directly via the Wi-Fi access or via the EUTRAN routing unit based on information in the tunneling protocol header. Accordingly, the capabilities of various networks, such as EUTRAN Wi-Fi, and wired network, may be combined at the routing unit level. Such aggregation of data packets can, for example, help to attain high data transmission speeds. In addition, such a provision may allow the network terminal to aggregate multiple access link capacities for certain applications in scenarios where such applications may be restricted for access only via the associated core network, such as in enterprise network.

Accordingly, the present subject matter provides a dynamic selection of an access network anchor node and a core network anchor node, to allow the data packet to be routed through a specifically selected combination of the access network and the core network. In addition, the encapsulation of data packets, in the manner achieved in the present subject matter, is agnostic to various high layer protocols, such like the Transmission Control Protocol (TCP) or the User Datagram Protocol (UDP). Therefore, the implementation of the present subject matter may be achieved effectively and the communication remains unaffected being agnostic to the other layers.

The manner in which the aspects for data transmission in the communication network environment shall be implemented has been explained in detail with respect to the FIG. 1 to FIG. 5. While aspects of described aspects for data transmission in the communication network environment may be implemented in any number of different computing systems, transmission environments, and/or configurations, the embodiments are described in the context of the following system(s) as examples.

Figure 1:
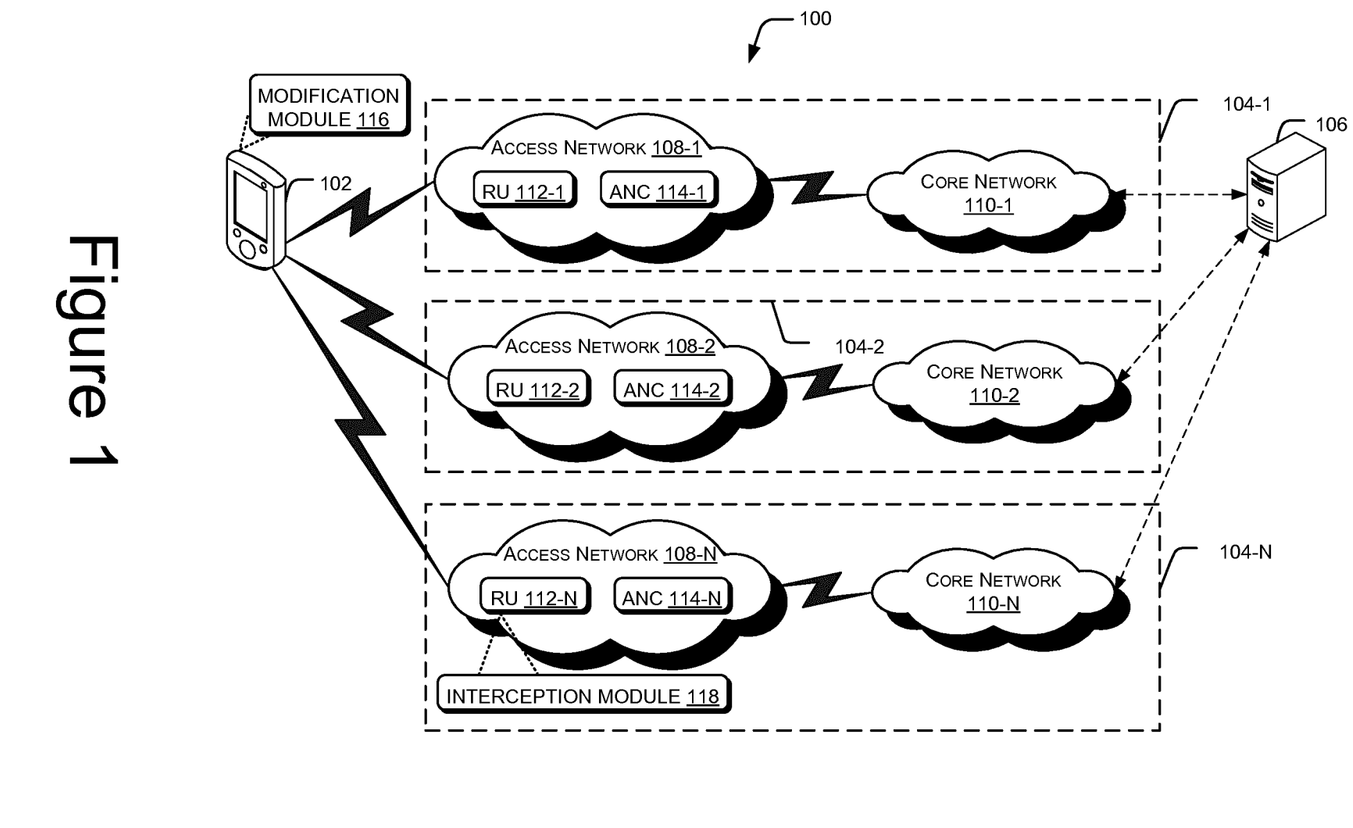
FIG. 1 illustrates a communication network environment implementation for data transmission, according to an embodiment of the present subject matter.

FIG. 1 illustrates a communication network environment 100 for data transmission, according to an embodiment of the present subject matter. The network environment 100 includes a network terminal 102 for transmitting data in the communication network environment 100. In an example, the network terminal 102 may be a user equipment (UE) carrying out communication in the communication network environment 100, and may include desktop computers, hand-held computing devices, laptops portable computers, network computers, or wireless handheld devices, such as mobile phones, personal digital assistant (PDA), smart phones dash top mobiles, and multi-media enabled phones.

Further, the communication network environment 100 may include a plurality of communication networks 104-1, 104-2 . . . 104-N, collectively referred to as communication networks 104 and individually referred to as a communication network 104. The network terminal 102 may be coupled to each of the communication networks 104 to connect to a target terminal 106 outside the communication networks 104. In an example, the target terminal 106 may be a server hosting an application with which a client application at the network terminal 102 may establish communication to access and exchange data. In an example, the target terminal 106 may be implemented as a central directory server, a database server, a web server, or an application server.

Each of the communication networks 104 may be a wireless or a wired network, or a combination thereof. The communication network 104 may be a collection of individual networks, interconnected with each other and functioning as a single large network, for example, the internet or an intranet). Few or all of the communication networks may be implemented as one of the different types of networks, such as local area network (LAN), wide area network (WAN), Wireless Local Area Network (WLAN), the internet, and such. In such a case, the communication network may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. In one example, the network terminal 102 may use General Packet Radio Service (GPRS) for communicating over a communication network 104. In addition, few or all of the communication networks 104 may be implemented as individual networks including, but are not limited to, 3GPP Long Term Evolution (LTE), Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), IP-based network, Public Switched Telephone Network (PSTN), and Integrated Services Digital Network (ISDN). For example, the communication network 104 may include a telephone network, such as a PSTN network, for facilitating users of an enterprise to communicate with each other. In other words, the communication networks 104 may include cellular telecommunication networks, wired networks, or wireless networks other than cellular telecommunication networks, or a mix thereof.

Each communication network 104 may include an access network and a core network. For example, the communication network 104-1 may include an access network 108-1 and a core network 110-1, and the communication network 104-2 may include an access network 108-2 and a core network 110-2, and so on. The access networks 108-1, 108-2 . . . 108-N are collectively referred to as access networks 108 and individually referred to as an access network 108. Similarly, the core networks 110-1, 110-2 . . . 110-N are collectively referred to as core networks 110 and individually referred to as a core network 110. Further, each of the access networks 108 and each of the core networks 110 may include a variety of network entities, including routers, bridges, gateways, computing devices, and storage devices, depending on the technology; however, such details have been omitted for the sake of brevity.

Further, each access network 108 may include devices for effecting communication in the communication network 104. Each access network 108 may include a routing unit and an access network controller. For example, the access network 108-1 may include a routing unit 112-1 and the access network controller 114-1, whereas the access network 108-2 may include a routing unit 112-2 and an access network controller 114-2, and so on. The routing units 112-1, 112-2 . . . 112-N are collectively referred to as routing units 112 and individually referred to as a routing unit 112. Similarly, the access network controllers 114-1, 114-2 . . . 114-N are collectively referred to as access network controllers 114 and individually referred to as an access network controller 114. For example, the routing unit 112 may be the entity that does the IP layer routing and the associated access network controller 112 may control the routing unit 112.

In operation, the network terminal 102 and the routing unit 112 are provided with a flexibility for selecting either an access network 108 or a core network 110 or both, from among the pool of access networks 108 and core networks 110 available in the communication network environment 100. In an example, in a downlink route, the access network 108 can be selected, whereas in an uplink route, the access network 108 as well as the core network 110 can be selected, the access network 108 and the core network 110 belonging to different communication networks 104. In other words, irrespective of the communication network 104 that an access network 108 and a core network 110 lies in, the network terminal 102 can indicate the selection of the access network 108 and the core network 110 for data transmission.

The routing unit 112 is, then, responsible for the routing of data over the selected networks 108 and 110. For example, for transmitting data packets in uplink and downlink routes for one or more applications on the network terminal 102, the network terminal 102 may indicate that the access network 108 in an EUTRAN is to be used and the core network 110 in a WLAN core is to be used, and for another set of applications, the network terminal 102 may indicate that the access network 108 in the EUTRAN is to be used and the core network 110 in a wire tethered network is to be used.

For operation for data transmission in the communication network environment 100, the network terminal 102 may include a modification module 116. Further, for operation for routing data in the communication network environment 100, the routing unit 112 in each access network 108 may include an interception module 118. Accordingly, to achieve the above mentioned flexibility, the modification module 116 can encapsulate a payload, such as an internet protocol (IP) layer payload, with a tunneling protocol header. In an example, the tunneling protocol header can be a generic routing encapsulation (GRE) header. The modification module 116 may modify one or more fields in the tunneling protocol header, append the tunneling protocol header to the payload to obtain an encapsulated data packet, and forward the encapsulated data packet to an access node, i.e., a routing unit 112 in one among the plurality of access networks 108. The selection of the routing unit 112 for forwarding the encapsulated data packet can be based on the information in the tunneling protocol header associated with the encapsulated data packet.

Further, based on the modified field, the interception module 118 in the routing unit 112 receiving the encapsulated data packet may intercept the data packet. In addition, the interception module 118 may identify, based on the tunneling protocol header on the encapsulated data packet, the access network 108 and the core network 110 to be used in an uplink route, i.e., from the network terminal 102 to the core network 110 for data transmission. Further, the relevant routing unit 112 can route the encapsulated data packet to the indicated core network 110, as per the tunneling protocol header. In the reverse route, i.e., a downlink route, the interception module 118 can identify from the tunneling protocol header the access network 108 for transmitting the data packet to the network terminal 102. In such a case, the modification module 116 can include such information regarding routing the downlink path based on negotiations between the network terminal 102 and the routing unit 112 before data is exchanged. In an example, for negotiating with the routing unit 112, network terminal 102 can communicate with the access network controller 114 associated with the routing unit 112 in that communication network 104.

The details of the network terminal 102 and the routing unit 112, in data transmission and in routing the data, respectively are explained in further detail with reference to the description of the foregoing Figures, i.e., FIG. 2 and FIG. 3.

Figure 2:
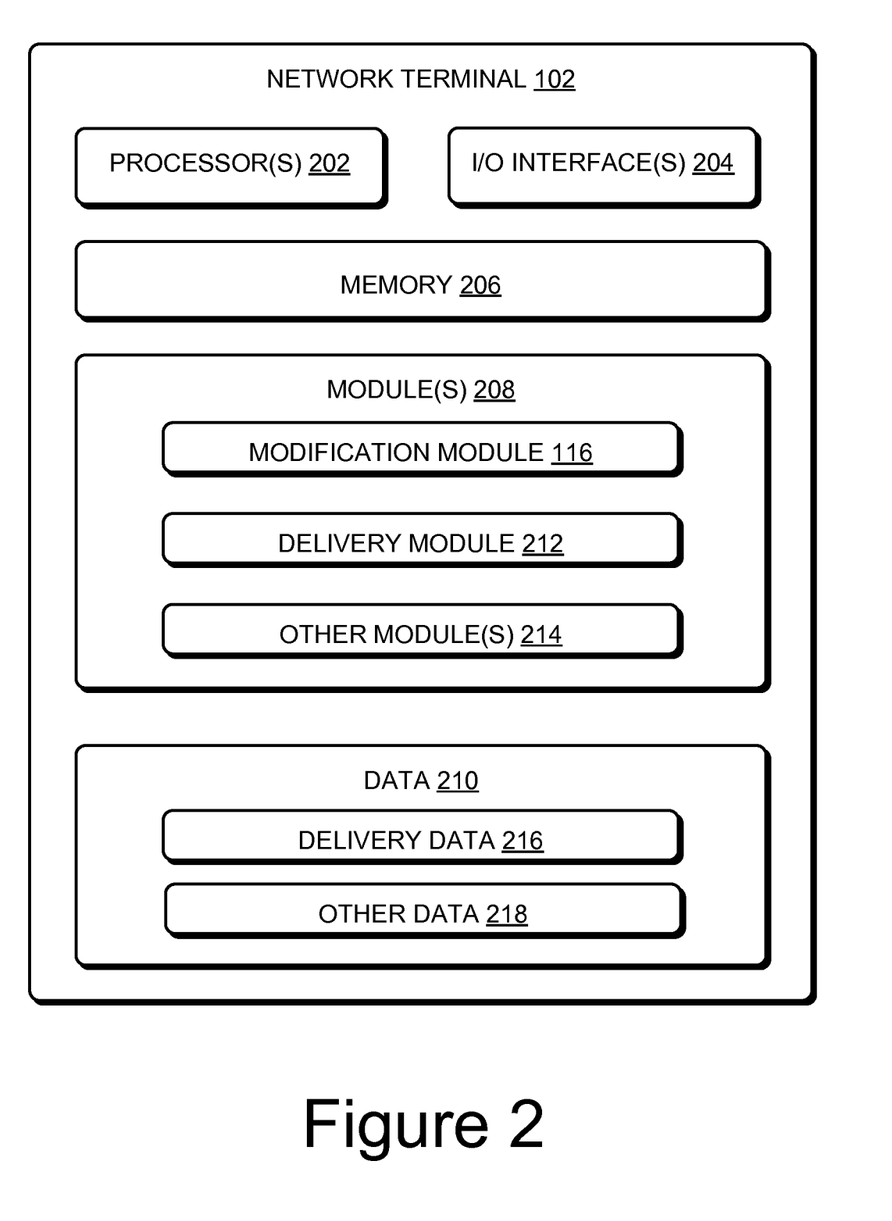
FIG. 2 illustrates a network terminal implemented for data transmission in the communication network environment, according to an embodiment of the present subject matter.

FIG. 2 illustrates the network terminal 102, in accordance with an embodiment of the present subject matter. In an implementation, the network terminal 102 may include one or more processor(s) 202, I/O interfaces 204, and a memory 206 coupled to the processor 202. The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 206.

The I/O interfaces 204 may include a variety of software and hardware interfaces, for example, interfaces for peripheral device(s), such as a keyboard, a mouse, a display unit, an external memory, and a printer. Further, the I/O interfaces 204 may enable the network terminal 102 to communicate with other devices, such as a tag reader (not shown in the figure), other computing devices, and other external databases (not shown). The I/O interfaces 204 can facilitate multiple communications within a wide variety of networks and protocol types, including wired networks, for example, local area network (LAN), cable, etc., and wireless networks, such as Wireless LAN (WLAN), cellular network, or satellite. For this purpose, the I/O interfaces 204 include one or more ports for connecting a number of computing systems with one another or to a network.

The memory 206 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the network terminal 102 also includes module(s) 208 and data 210.

The module(s) 208, amongst other things, include routines, programs, objects, components, data structures, etc., which perform particular tasks or implement data types. The module(s) 208 may also be implemented as, signal processor(s), state machine(s), logic circuitries, and/or any other devices or components that manipulate signals based on operational instructions. Further, the module(s) 208 can be implemented in hardware, instructions executed by a processing unit, or by a combination thereof. The processing unit can comprise a computer, a processor, such as the processor 202, a state machine, a logic array, or any other suitable devices capable of processing instructions. The processing unit can be a general-purpose processor which executes instructions to cause the general-purpose processor to perform the relevant tasks or, the processing unit can be dedicated to perform the relevant functions.

In another aspect of the present subject matter, the module(s) 208 may be machine-readable instructions (software) which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via a network connection.

In one implementation, the module(s) 208 may include, in addition to the modification module 116, a delivery module 212 and other module(s) 214. The other modules 214 may include programs or coded instructions that supplement applications and functions of the network terminal 102.

The data 210 serves, amongst other things, as a repository for storing data processed, received, and generated by one or more of the module(s) 208. The data 210 includes delivery data 216 and other data 218. The other data 218 includes data generated as a result of the execution of one or more modules in the module(s) 208.

During the operation of the network terminal 102, one or more applications running on the network terminal 102 may attempt to establish communication with the target terminal 106. Accordingly, the application may generate data packets or payloads that are to be communicated to the target terminal via an uplink route. In an example, the payload may include, but not limited to, request for information, or the like. Further, different applications may attempt to establish communication with different core network 110 via a different access network 108. For example, one application may seek to receive the data packets from one core network 110, such as a EUTRAN core network 110 over the enterprise access network 108. Such information of the access network 108 and the core network 110 may be provided along with the payloads.

To provide such information, the payload, prior to their transmission, may be appended with a tunneling protocol header to the payload by the modification module 116 to obtain an encapsulated data packet. In addition, the modification module 116 can modify the tunneling protocol header to indicate either the access network 108 or the core network 110 or both to be used for routing the encapsulated data packet.

In one case, the access network 108 and the core network 110 to be used in the uplink route can be indicated in the tunneling protocol header, where the access network 108 and the core network 110 belong to different communication networks 104. In another case, the access network 108 to be used in the downlink route can be indicated in the tunneling protocol header, the access network 108 belonging to a different communication network 104 than that of the core network 110 from which the payload is received. For example, the modification module 116 can append the tunneling protocol header when either the selected core network 110 or the selected access network 108 or both are different from the access network 108 and/or the core network 110 to which the network terminal 102 is anchored. In other words, the modification module 116 may modify the tunneling protocol header to each payload based on the selection of the core network 110 and the access network 108, for instance, from different communication networks 104, by the network terminal 102 for the application.

In an example, the tunneling protocol header can be generic routing encapsulation (GRE) header. In said example, the tunneling protocol header can include a key field to indicate a destination core network 110, for instance, in the form of an IP of the destination core network 110, for the encapsulated data packet to be delivered. Accordingly, at the time of routing, the routing unit 112 can, based on the key field, determine the core network 110 to which the encapsulated data packet is to be routed. For example, in case the encapsulated data packet is received from a EUTRAN access network, the routing unit 112 can still forward the encapsulated data packet to a WLAN core network.

According to an aspect, the tunneling protocol header may also include a delivery header which may be updated by the interception module 118 to include an intercept unique identification address (UIA). For example, the intercept UIA may be an IP address associated with the routing unit 112 at which the encapsulated data packet is to be intercepted. The intercept UIA can be used by the network terminal 102 to identify the access network 104 to be used for transmission, i.e., to identify the routing unit 112 to be reached. In addition, the intercept UIA can be an indication for the routing unit 112, for example, for the interception module 118 in the routing unit 112, to identify whether the data packet is to be intercepted or not.

In an example, the delivery header can include a source and destination IP address which can be set such that IP routing tables at the network terminal 102 can be used to direct the encapsulated data packets onto the appropriate interface. For example, when the payload is encapsulated with the tunneling protocol header, the destination IP header as the IP address of an LTE interface, so the network terminal 102 sends the encapsulated data packet over the LTE interface to the eNodeB. The destination IP address can be such that it is consumed by the routing unit 112, i.e., at the eNodeB in the present example.

According to an aspect, the modification module 116 may also provide a sequence of the payloads in which the payloads are to be delivered to the routing unit 112. Accordingly, in said aspect, the tunneling protocol header can include a sequence field. In an example, based on the sequence field in the tunneling protocol header, the routing unit 112 can also achieve aggregation in the uplink route and the downlink route of transmitting and routing the data packets.

The encapsulated data packets, after being appended and modified by the modification module 116, may be transmitted to the routing unit 112 by the delivery module 212. In an example, the delivery module 212 may transmit the encapsulated data packets to the indicated core network 110 via the indicated access network 108. In an example, in order to transmit the encapsulated data packets, the delivery module 212 may select the routing unit 112 based on the tunneling protocol header. In other words, the delivery module 212 can anchor the network terminal 102 to access network 108 indicated by the tunneling protocol header and may transmit the encapsulated data packets to the routing unit 112 of that access network 108. In another case, when the selected routing unit 112 belongs to an access network 108 different from the one indicated in the tunneling protocol header, the interception module 118 of the selected routing unit 112 can route the encapsulated data packet to another routing unit 112 of the indicated access network 108 to be used.

Further, the delivery module 212 may negotiate the delivery of the encapsulated data packets with the selected routing unit 112 to transmit the encapsulated data packets. In an example, negotiation may include establishing a connection between the network terminals 102 with the selected routing unit 112. Once the negotiation is complete, the encapsulated data packets may be transmitted to the selected routing unit 112. In an example, for negotiating with the selected routing unit 112, the delivery module 212 can communicate with the access network controller 114 associated with the routing unit 112 in that communication network 104.

In an example, the delivery module 212 can negotiate the delivery based on the key field in the tunneling protocol header, i.e., the field indicating the core network 110. In said example, the delivery module 212 of the network terminal 102 can negotiate with the relevant routing unit 112 for using the core network 110 mentioned in the key field. For example, in the uplink route in a EUTRAN, before the eNodeB receives the encapsulated data packet from the network terminal 102, the delivery module 212 negotiates with the eNodeB that the WLAN core network is to be used instead of the EUTRAN core network. In said example, after the negotiation is complete, the modification module 116 can populate the key field in the tunneling protocol header to indicate to the eNodeB that the encapsulated data packet is to be routed to the WLAN core network when the eNodeB receives the data packet over the EUTRAN access network.

In addition, the delivery module 212 can negotiate the delivery in such a way that other applications on the network terminal 102 are not adversely affected. As explained previously, the delivery module 212 may use the sequence field in the tunneling protocol header to regulate the sequence in which the data packets are routed and delivered.

Figure 3:
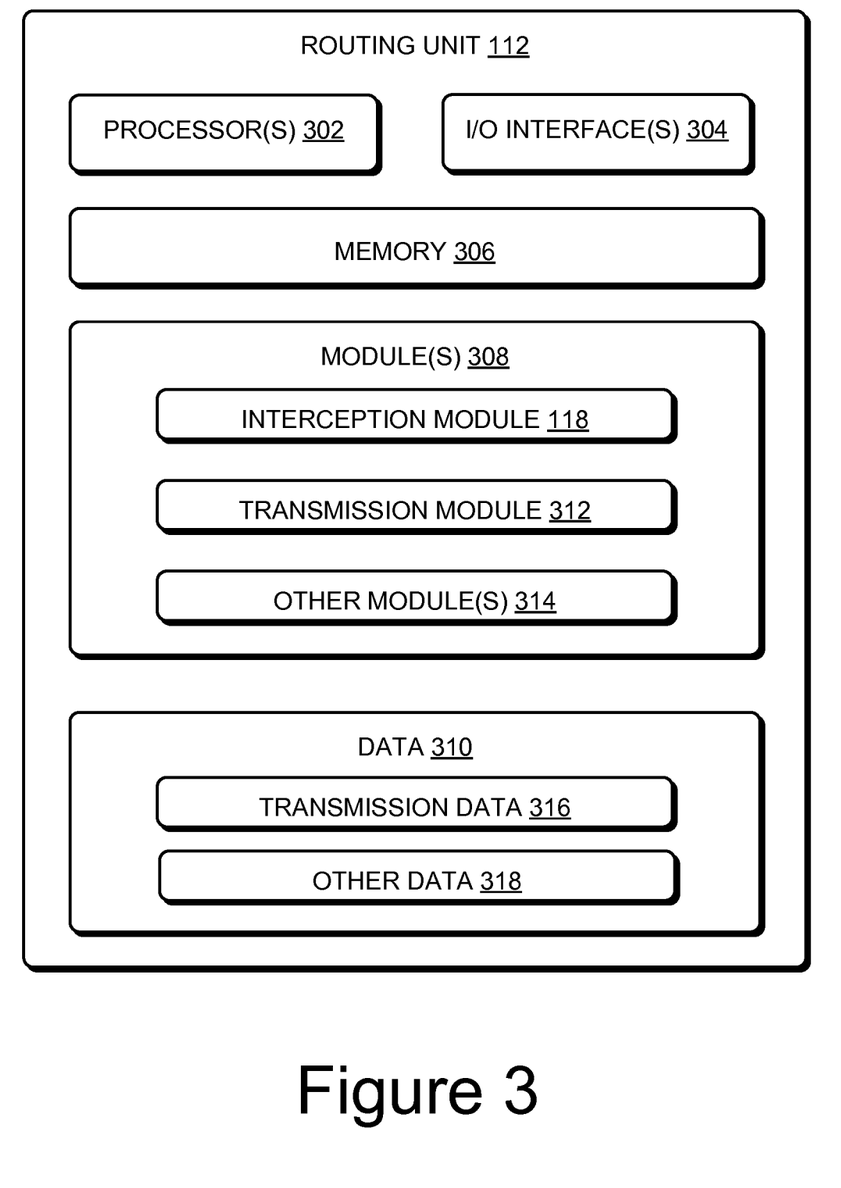
FIG. 3 illustrates a routing unit for routing data in the communication network environment to transmit data, according to an embodiment of the present subject matter.

FIG. 3 illustrates the routing unit 112, in accordance with one embodiment of the present subject matter. In an implementation, the routing unit 112 may include one or more processor(s) 302, I/O interfaces 304, and a memory 306 coupled to the processor 302. The processor 302 can be a single processing unit or a number of units, all of which could include multiple computing units. The processor 302 may be implemented as one or more microprocessors, microcomputers, microcontrollers, digital signal processors, central processing units, state machines, logic circuitries, and/or any devices that manipulate signals based on operational instructions. Among other capabilities, the processor 302 is configured to fetch and execute computer-readable instructions and data stored in the memory 306.

The I/O interfaces 304 may include a variety of software and hardware interfaces, for example, interfaces for peripheral device(s), such as a keyboard, a mouse, a display unit, an external memory, and a printer. Further, the I/O interfaces 304 may enable the routing unit 112 to communicate with other devices, such as a tag reader (not shown in the figure), other computing devices, and other external databases (not shown). The I/O interfaces 304 can facilitate multiple communications within a wide variety of networks and protocol types, including wired networks, for example, local area network (LAN), cable, etc., and wireless networks, such as Wireless LAN (WLAN), cellular network, or satellite. For the purpose, the I/O interfaces 304 include one or more ports for connecting a number of computing systems with one another or to a network.

The memory 306 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the routing unit 112 also includes module(s) 308 and data 210.

The module(s) 308, amongst other things, include routines, programs, objects, components, data structures, etc., which perform particular tasks or implement data types. The module(s) 308 may also be implemented as, signal processor(s), state machine(s), logic circuitries, and/or any other devices or components that manipulate signals based on operational instructions. Further, the module(s) 308 can be implemented in hardware, instructions executed by a processing unit, or by a combination thereof. The processing unit can comprise a computer, a processor, such as the processor 302, a state machine, a logic array, or any other suitable devices capable of processing instructions. The processing unit can be a general-purpose processor which executes instructions to cause the general-purpose processor to perform the relevant tasks or, the processing unit can be dedicated to perform the relevant functions.

In another aspect of the present subject matter, the module(s) 308 may be machine-readable instructions (software) which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via a network connection.

In one implementation, the module(s) 308 may further include, in addition to the interception module 118, a transmission module 312, and other module(s) 314. The other modules 314 may include programs or coded instructions that supplement applications and functions of the routing unit 112.

The data 310 serves, amongst other things, as a repository for storing data processed, received, and generated by one or more of the module(s) 308. The data 310 includes transmission data 316 and other data 318. The other data 318 includes data generated as a result of the execution of one or more modules in the module(s) 308.

The routing unit 112, in operation, may receive the encapsulated data packets from the network terminal 102.

Further, the interception module 118 may intercept the encapsulated data packets. In an example, as mentioned previously, the tunneling protocol header may be used to determine the routing unit 112 at which the encapsulated data packet is to be intercepted. Thereafter, the interception module 118 may determine the indicated access network 108 and the core network 110 based on the tunneling protocol header.

In an example, the interception module 118 may determine the selected routing unit 112 for receiving the encapsulated data packet and for intercepting the encapsulated data packet based on the intercept UIA indicated in the delivery header of the tunneling protocol header. In an example, the data packets may be intercepted at an IP layer of the routing unit 112, for instance, by an IP proxy in the routing unit 112.

The interception module 118 receiving the data packet from the network terminal 102, based on the intercept UIA associated with the encapsulated data packet, may identify that this data packet is not to be routed using the normal route, but is to be routed based on a distinct routing selection of, for instance, the access network 108 of one communication network 104 and the core network 110 of another communication network 104. Therefore, in other words, the intercept UIA allows the interception module 118 to identify whether the data packet is to be routed as usual or in accordance with the information in the tunneling protocol header. In other words, based on the intercept UIA, the interception module 118 can identify whether the encapsulated data packet is to be intercepted by the interception module 118 and routed, based on the distinct instruction, from the network terminal 102. Otherwise, the routing unit 112 can route the data packet over the core network 110 that the network terminal 102 is anchored to. Therefore, the intercept UIA provides an abstraction layer visibility, i.e., IP layer visibility in the above example, which is otherwise provided at the core network 110.

Further, the interception module 118 can identify, based on the tunneling protocol header on the encapsulated data packet, the access network 108 and the core network 110 to be used in an uplink route, i.e., from the network terminal 102 to the core network 110, for data transmission. In the reverse route, i.e., a downlink route, the interception module 118 can identify the access network 108 for data transmission. Therefore, the interception module 118 can identify either the access network 108 or the core network 110 or both for data transmission from the tunneling protocol header. In an example, when the routing unit 112 belongs to an access network 108 different from the one indicated in the tunneling protocol header, the routing unit 112 can route the encapsulated data packet to another routing unit 112 based on the access network 108 to be used. For example, the interception module 118 may determine whether encapsulated data packets are to be routed through the routing unit 112 of the communication network 104, such as enterprise network. Accordingly, the interception module 118 may relay the information of the indicated access network 108, the indicated core network 110, and the determined routing unit 112 to the transmission module 312.

The transmission module 312, in operation, may transmit the encapsulated data packets to the target terminal through the indicated core network 110 over the indicated access network 108. For example, the indicated access network 108 may be the enterprise access network 108 and the indicated core network 110 may be the EUTRAN core network 110. Accordingly, the transmission module 312 may transmit the encapsulated data packets to the EUTRAN core network 110 via the enterprise access network 108. Further, as would be understood by a person skilled in the art, the routing unit 112 can transmit the payload to the core network 1120 and the tunneling protocol header may be stripped off before the encapsulated data packet is sent from the routing unit 112. For example, the transmission module 312 may remove the tunneling protocol header from the payload prior to the transmission.

In an example, from the tunneling protocol header, the transmission module 312 can obtain the information that irrespective of whether the data packets are received over a EUTRAN access network or a Wi-Fi access network, the data packets are to be routed in the uplink route over the Wi-Fi access network and a WLAN core network. The data packet received at the Wi-Fi routing unit, may be routed via the EUTRAN routing unit, and then routed to the WLAN core network, based on the tunneling protocol header. The Wi-Fi routing unit may re-order the packets received directly via the Wi-Fi routing unit or via the EUTRAN routing unit based on information in the tunneling protocol header.

In addition, the transmission module 312 may also determine the sequence in which the encapsulated data packets are to be delivered. There might be case where the encapsulated data packets may be received out of order. Therefore, the transmission module 312 may transmit the encapsulated data packets in the predefined sequence thereby preventing any loss in the data packet transmission, that otherwise would have caused due to irregular sequence of the encapsulated data packets. For example, the transmission module 312 may use the sequence field to re-order the encapsulated data packets before delivery to the network terminal 102 in the downlink route or before delivery to the core network 110 in the uplink route. In addition, in such a case, the transmission module 312 may aggregate the encapsulated data packets in the predefined sequence. Accordingly, the capabilities of different networks, such as EUTRAN, Wi-Fi, and wired network, may be combined at the level of the routing unit 112. For instance, the data packets from the EUTRAN and Wi-Fi core network can be aggregated for the correct sequencing at the routing unit 112 in the downlink route. Accordingly, when the entire chunk of aggregated data packets are transmitted from the routing unit 112 to the network terminal 102, a high speed of transmission can be achieved.

Further, by updating and modifying the tunneling protocol header, the transmission of the encapsulated data packets can be regulated in the downlink route, i.e., from the core network 110 and via the access network 108 to the network terminal 102. In the downlink route, in one example, the bare payload can be received at the routing unit 112 in the access network 108 from the associated core network 110, based on the negotiations between the network terminal 102 and the routing unit 112. At the routing unit 112, the interception module 118 can append and modify the tunneling protocol header to the payload and obtain the encapsulated data packet.

As part of modifying the tunneling protocol header, the interception module 118, based on previous negotiations between the network terminal 102 and the routing unit 112, can determine the access network 108 to be used for delivery of the encapsulated data packet to the network terminal 102. In case the interception module 118 determines that the negotiations indicate that an access network 108 other than the one receiving the payload is to be used, the interception module 118 can update such information in the tunneling protocol header. Accordingly, the transmission module 312 can route the encapsulated data packet to the other routing unit 112. In other words, in the downlink route also, routing unit 112 can determine from the tunneling protocol header as to whether the encapsulated data packets are to be delivered to the network terminal 102 by the receiving routing unit 112 or forwarded to another routing unit 112.

In addition, the interception module 118 can modify the tunneling protocol header packet to update the sequence field so that the receiving network terminal 102 can reorder the packets coming out of sequence in the downlink route.

Figure 4:
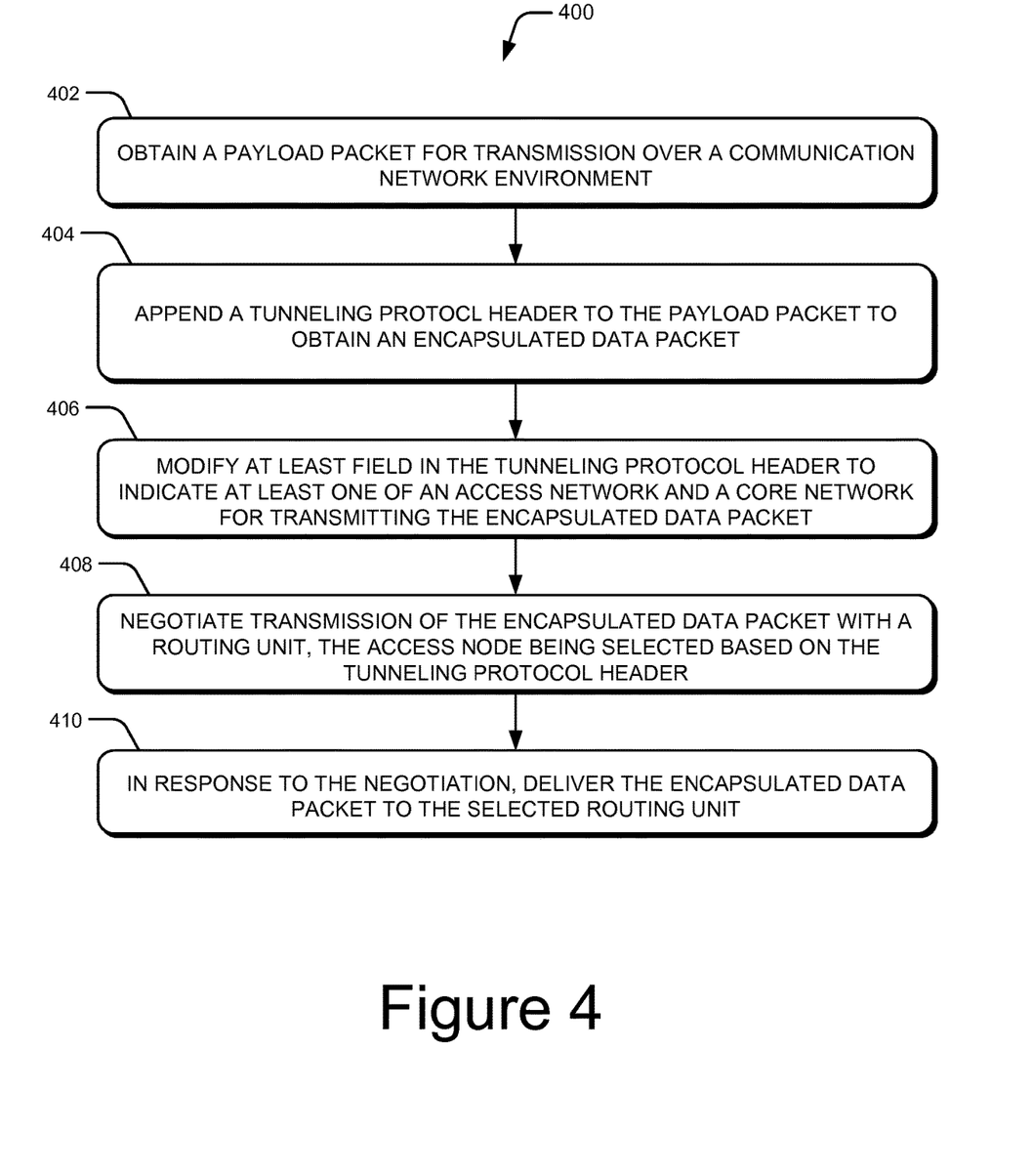
FIG. 4 illustrates a method for data transmission in a communication network environment, according to an embodiment of the present subject matter.
Figure 5:
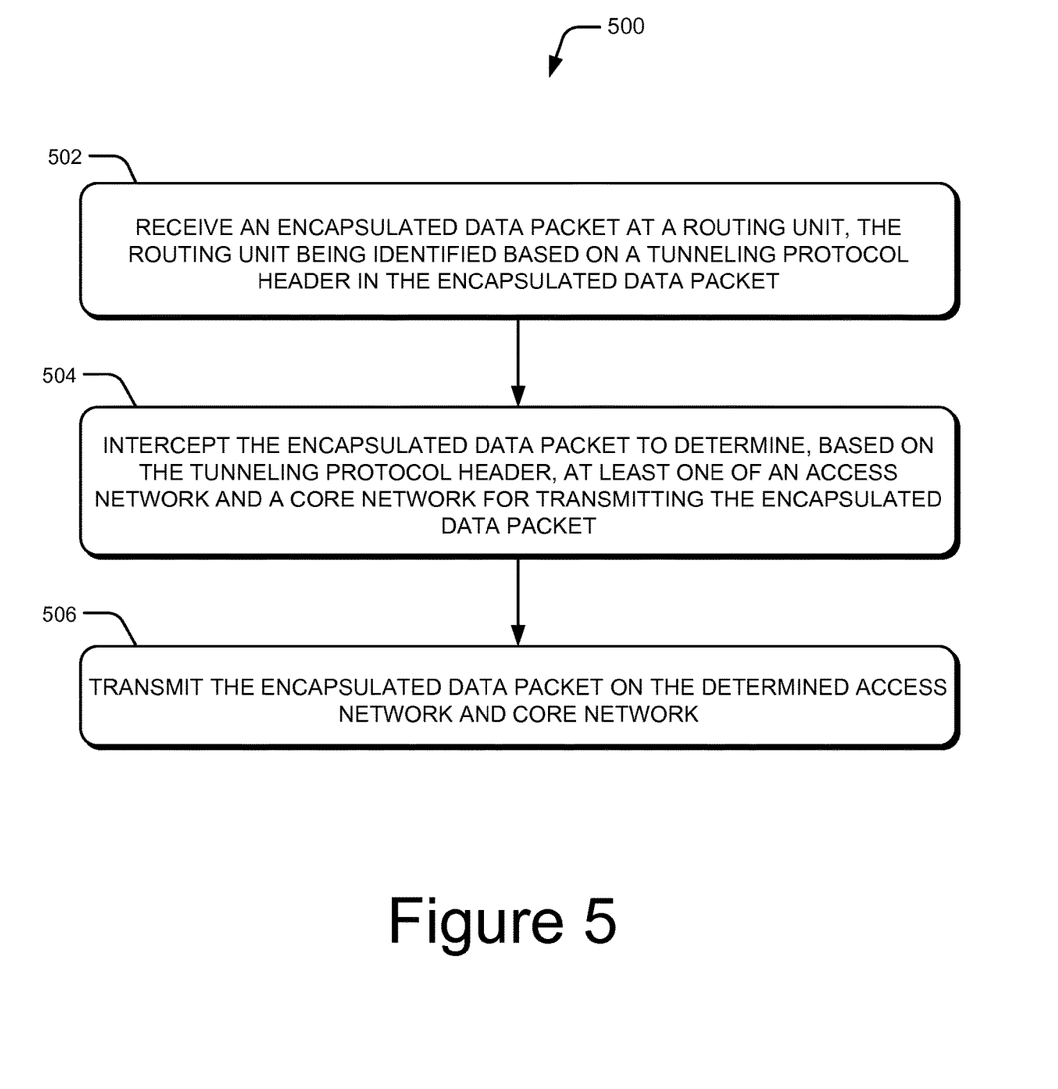
FIG. 5 illustrates a method for routing data in the communication network environment to transmit data, according to an embodiment of the present subject matter.

FIG. 4 and FIG. 5 illustrate a method 400 for data transmission in a communication network environment 100 and a method 500 for routing data in the communication network environment 100 to transmit data, respectively, in accordance with one embodiment of the present subject matter. The order in which the methods 400 and 500 are described is not intended to be construed as a limitation, and any number of the described method blocks can be combined in any order to implement the methods 400 and 500, or an alternative method. Additionally, individual blocks may be deleted from the methods 400 and 500 without departing from the spirit and scope of the subject matter described herein. Furthermore, the methods 400 and 500 can be implemented in any suitable hardware, software, firmware, or combination thereof.

The methods 400 and 500 may be described in the general context of computer executable instructions. Generally, computer executable instructions can include routines, programs, objects, components, data structures, procedures, modules, functions, etc., that perform particular functions or implement particular abstract data types. The methods 400 and 500 may also be practiced in a distributed computing environment where functions are performed by remote processing devices that are linked through a communication network. In a distributed computing environment, computer executable instructions may be located in both local and remote computer storage media, including memory storage devices.

A person skilled in the art will readily recognize that steps of the methods 400 and 500 can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of the described methods 400 and 500. The program storage devices may be, for example, digital memories, magnetic storage media, such as a magnetic disks and magnetic tapes, hard drives, or optically readable digital data storage media. The embodiments are also intended to cover all the communication networks and communication devices configured to perform said steps of the methods 400 and 500.

In an implementation, the method 400 may be performed by a system, such as the network terminal 102. For the sake of brevity of description of FIG. 4, the components of the network terminal 102 performing the various steps of the method 400 are not described in detail with reference to FIG. 4. Such details are provided in the description provided with reference to FIG. 1 and FIG. 2.

Referring to FIG. 4, at block 402, payloads may be obtained for transmission over the communication network environment 100. In the illustrated embodiment, the payloads may be generated by one or more applications running on the network terminal 102 that may seek to exchange data over the communication network environment 100. In an example, the payloads can be in the form of a request for data packets for the application in the network terminal 102. In another example, the payload may contain data packets that the application may transmit to the target terminal. In the illustrated embodiment, for each generated payloads, a sequence of payloads in which the payloads are to be transmitted may be determined.

At block 404, the payload may be appended with the tunneling protocol header to obtain the encapsulated data packet.

At block 406, the tunneling protocol header can be modified to indicate either the access network 108 or the core network 110 or both to be used for routing the encapsulated data packet. In one case, the access network 108 and the core network 110 belonging to different communication networks 104 and to be used in the uplink route can be indicated in the tunneling protocol header. In another case, the access network 108 to be used in the downlink route can be indicated in the tunneling protocol header. In such a case, the access network 108 belongs to a different communication network 104 than the communication network 104 of the core network 110 sending the payload in the downlink route. In other words, the payload may be appended with the tunneling protocol header based on the selection of the core network 110 and the access network 108, for instance, from different communication networks 104, by the network terminal 102 for the application. Further, as part of modifying the tunneling protocol header, a delivery header of the tunneling protocol header can be modified or updated to include an intercept UIA to identify a routing unit 112 for delivery of the encapsulated data packet. In addition, as explained earlier, the tunneling protocol header can be updated based on the negotiations between the network terminal 102 and the routing unit 112. The information in the tunneling protocol header can be used selectively for routing the data in the uplink route and the downlink route, as explained above.

Further, at block 408, transmission and delivery of the encapsulated data packets can be negotiated with the routing unit 112 to transmit the encapsulated data packets. The routing unit 112 selected for negotiation and transmission can be determined based on information in the tunneling protocol header. Further, in an example, the negotiation with the routing unit 112 can be based on a key field in the tunneling protocol header, i.e., a field indicating the core network 110.

At block 410, in response to the negotiation, the encapsulated data packet can be delivered to the selected routing unit 112 as indicated in the tunneling protocol header.

FIG. 5, as mentioned previously, illustrates the method 500 for routing data in the communication network environment 100 to transmit data. As will be understood, method 500 is in continuation of method 400. Therefore, in an implementation, the method 500 is executed after the encapsulated data packet is received at the selected routing unit 112. In said implementation, the method 500 may be performed by a system, such as the routing unit 112. For the sake of brevity of description of FIG. 5, the components of the routing unit 112 performing the various steps of the method 500 are not described in detail with reference to FIG. 5. Such details are provided in the description provided with reference to FIG. 1 and FIG. 3.

Referring to FIG. 5, at block 502, an encapsulated data packet is received at the routing unit 112. In the uplink route, the encapsulated data packet can be received from a network terminal 102. The routing terminal 112 for receiving the encapsulated data packet can be identified based on the tunneling header protocol in the encapsulated data packet. In an example, the intercept UIA indicated in the delivery header of the tunneling protocol header can be used to identify the routing unit 112. In said example, the delivery header can include the IP address of the routing unit 112 associated with the EUTRAN anchored to the network terminal 102 as the destination address to enable interception of the encapsulated data packet. In the downlink route, the data packet can be received from the core network 110. In such a case, as explained previously, the appending and modification of the tunneling protocol header can be achieved at the routing unit 112.

At block 504, the encapsulated data packet is intercepted at the routing unit 112 and, as part of the interception, either the access network 108 or the core network 110 or both, as indicated for transmitting the encapsulated data packet are determined. For example, in the uplink route, as part of interception, the access network 108 and the core network 110, both belonging to different communication networks 104, can be identified. On the other hand, in the downlink route, the access network 108 to be used for transmission can be identified, for instance, based on the negotiations between the network terminal 102 and the routing unit 112 in the uplink route. In such a case, the access network 108 can belong to a different communication network 104 than the communication network 104 of the core network 110 from which the payload is received in the downlink route.

Further at block 506, the encapsulated data packet can be transmitted to the determined access network 108 and the determined core network 110. In the above example, in the uplink route, the encapsulated data packet can be transmitted to the determined access network 108 and then to the determined core network. In the downlink route, in one example, the encapsulated data packet can be transmitted directly to the network terminal from the routing unit 112 in the access network 108 receiving the payload from the core network 110. In another example, in case the access network to be used for transmitting the encapsulated data packet is different from the one receiving it, the encapsulated data packet can be transmitted to the determined access network 108 and then to the network terminal 102.

Though the transmission of the encapsulated data packets in the downlink route has been described with reference to the network terminal 102, in another example, a node (not shown in the Figures) in the core network 110 anchored to the network terminal 102 can transmit the encapsulated data in the downlink route. In addition, the modification of the tunneling protocol header, for instance, by setting the appropriate values in the relevant fields, and routing based on the modified tunneling protocol header has been explained with reference to the network terminal 102 also conducting tunneling protocol header inspection. In another case, however, such functions can be controlled by a remote controller using commonly available techniques, such as Software Defined Networking (SDN).

Although implementations for data transmission in a communication network environment have been described in a language specific to structural features and/or methods, it is to be understood that the appended claims are not necessarily limited to the specific features or methods described. Rather, the specific features and methods are disclosed as examples for data transmission in the communication network environment.

We claim:

1. A method for data transmission, the method comprising:
   appending a tunneling protocol header to a payload to obtain an encapsulated data packet at a terminal;
   modifying at least one field in the tunneling protocol header at the terminal to indicate at least one of an access network and a core network for transmitting the encapsulated data packet, wherein the access network and the core network belong to different communication networks of a communication network environment comprising a plurality of communication networks, wherein at least one communication network of the plurality of communication networks comprises the access network and the core network; and
   transmitting the encapsulated data packet from the terminal toward an access node for transmission to a target terminal via the at least one of the access network and the core network indicated in the at least one field of the tunneling protocol header;
   wherein the modifying comprises updating a delivery header of the tunneling protocol header to indicate an intercept unique identification address (UIA) of the access node, wherein said intercept UIA allows the access node to identify whether the data packet is to be routed as usual or in accordance with the information in the tunneling protocol header.

2. The method as claimed in claim 1, wherein the transmitting comprises:
   selecting the access node based on the tunneling protocol header; and
   negotiating delivery of the encapsulated data packet with the selected access node.

3. The method as claimed in claim 1, wherein the tunneling protocol header is a generic routing encapsulation (GRE) header.

4. A method of routing data, the method comprising:
   intercepting an encapsulated data packet from a terminal, the encapsulated data packet comprising a tunneling protocol header appended to a payload, the tunneling protocol header including at least one field indicative of at least one of an access network and a core network for transmitting the encapsulated data packet, wherein the access network and the core network belong to different communication networks of a communication network environment comprising a plurality of communication networks, wherein at least one communication network of the plurality of communication networks comprises the access network and the core network; and
   transmitting the encapsulated data packet to a target terminal via the at least one of the access network and the core network indicated in the at least one field of the tunneling protocol header;
   wherein the transmitting comprises determining an access node based on the tunneling protocol header comprising a delivery header having an intercept unique identification address (UIA);
   wherein the intercepting comprises determining an abstraction layer for intercepting the encapsulated data packet based on a protocol used for the intercept UIA.

5. The method as claimed in claim 4, wherein the tunneling protocol header includes a first field indicative of the access network and a second field indicative of the core network, wherein the access network belongs to a first communication network of the communication network environment, wherein the core network belongs to a second communication network of the communication network environment.

6. A terminal comprising:
   at least one processor; and
   at least one memory including computer program code;

wherein the at least one memory and the computer program code are configured to, with the at least one processor, cause the terminal at least to:
append a tunneling protocol header to a payload to obtain an encapsulated data packet, wherein the tunneling protocol header comprises a delivery header indicating an intercept unique identification address (UIA) of an access node;
modify at least one field in the tunneling protocol header to indicate at least one of an access network and a core network to transmit the encapsulated data packet, wherein the access network and the core network belong to different communication networks of a communication network environment comprising a plurality of communication networks, wherein at least one communication network of the plurality of communication networks comprises the access network and the core network; and
transmit the encapsulated data packet toward the access node for transmission to a target terminal via the at least one of the access network and the core network indicated in the at least one field of the tunneling protocol header.

7. The terminal as claimed in claim 6, wherein the transmitting of the encapsulated data packet comprises:
selecting the access node based on the tunneling protocol header; and
negotiating delivery of the encapsulated data packet with an access network controller associated with the selected access node.

8. The terminal as claimed in claim 6, wherein the tunneling protocol header is a generic routing encapsulation (GRE) header.

9. An access node comprising:
at least one processor; and
at least one memory including computer program code;
wherein the at least one memory and the computer program code are configured to, with the at least one processor, cause the access node at least to:
intercept an encapsulated data packet from a terminal, the encapsulated data packet comprising a tunneling protocol header appended to a payload, the tunneling protocol header including at least one field indicative of at least one of an access network and a core network for transmitting the encapsulated data packet, wherein the access network and the core network belong to different communication networks of a communication network environment comprising a plurality of communication networks, wherein at least one communication network of the plurality of communication networks comprises the access network and the core network; and
transmit the encapsulated data packet toward a target terminal via the at least one of the access network and the core network indicated in the at least one field of the tunneling protocol header;

wherein the intercept is to determine the access node for transmitting the encapsulated data packet to the target terminal based on a delivery header having an intercept unique identification address (UIA); and
wherein the at least one memory and the computer program code are configured to, with the at least one processor, cause the access node at least to re-order the encapsulated data packet before the transmit based on a sequence field in the tunneling protocol header.

10. The access node as claimed in claim 9, wherein the tunneling protocol header includes a first field indicative of the access network and a second field indicative of the core network, wherein the access network belongs to a first communication network of the communication network environment, wherein the core network belongs to a second communication network of the communication network environment.

11. A non-transitory computer-readable medium comprising instructions executable by a processing resource at a terminal to:
append a tunneling protocol header to a payload to obtain an encapsulated data packet;
modify at least one field in the tunneling protocol header to indicate at least one of an access network and a core network for transmitting the encapsulated data packet, wherein the access network and the core network belong to different communication networks of a communication network environment comprising a plurality of communication networks, wherein at least one communication network of the plurality of communication networks comprises the access network and the core network; and
transmit the encapsulated data packet from the terminal toward an access node for transmission to a target terminal via the at least one of the access network and the core network indicated in the at least one field of the tunneling protocol header;
wherein modifying at least one field in the tunneling protocol header comprises updating a delivery header of the tunneling protocol header to indicate an intercept unique identification address (UIA) of the access node, wherein said intercept UIA allows the access node to identify whether the data packet is to be routed as usual or in accordance with the information in the tunneling protocol header.

12. The non-transitory computer-readable medium as claimed in claim 11, wherein transmitting the encapsulated data packet comprises:
selecting the access node based on the tunneling protocol header; and
negotiating delivery of the encapsulated data packet with the selected access node.

13. The non-transitory computer-readable medium as claimed in claim 11, wherein the tunneling protocol header is a generic routing encapsulation (GRE) header.

* * * * *